Feb. 1, 1927.
H. P. WILLIAMS
1,616,099
AGRICULTURAL ATTACHMENT FOR TRACTORS
Filed March 26, 1926  2 Sheets-Sheet 2
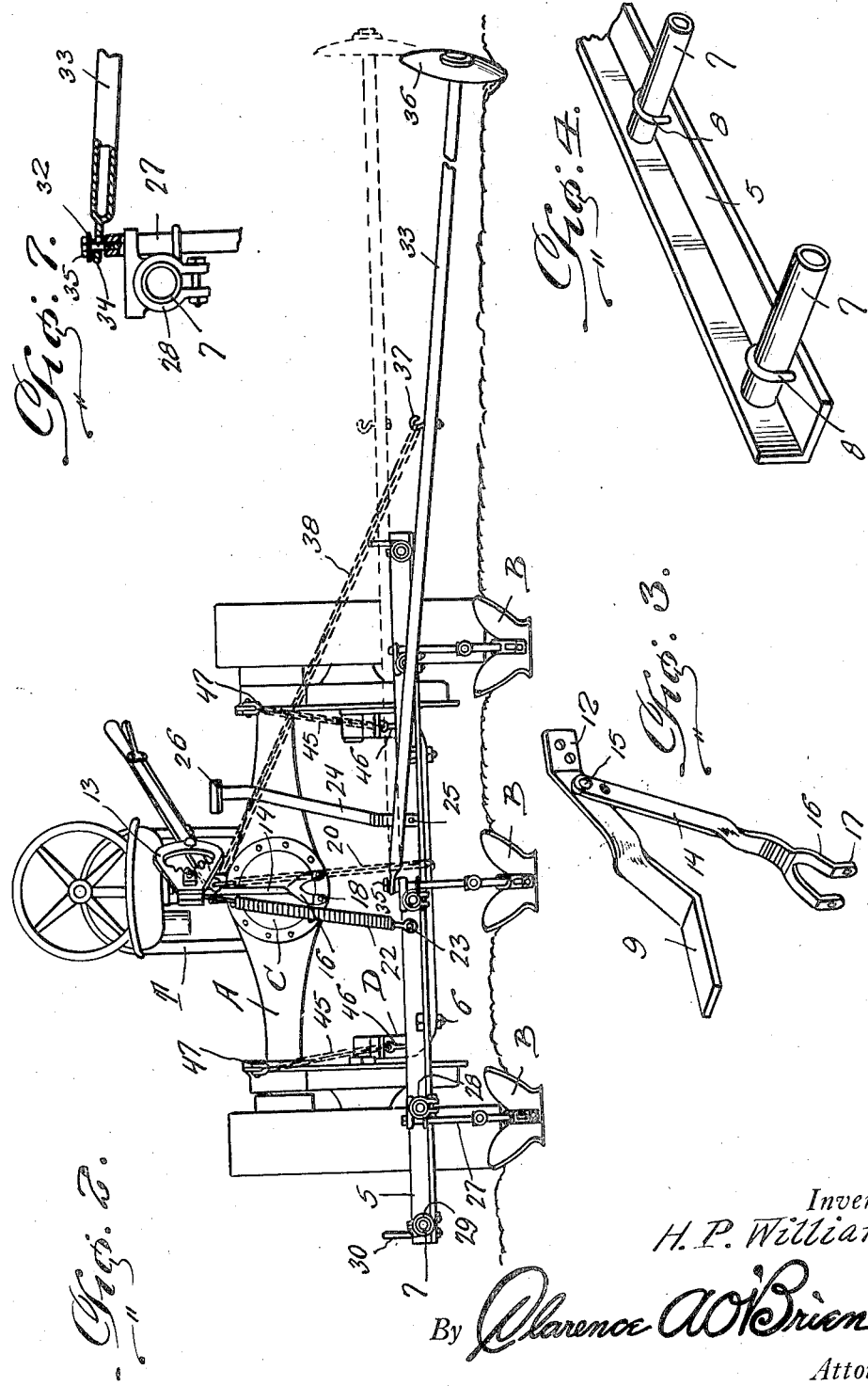
Inventor
H. P. Williams
By Clarence A. O'Brien
Attorney Patented Feb. 1, 1927.

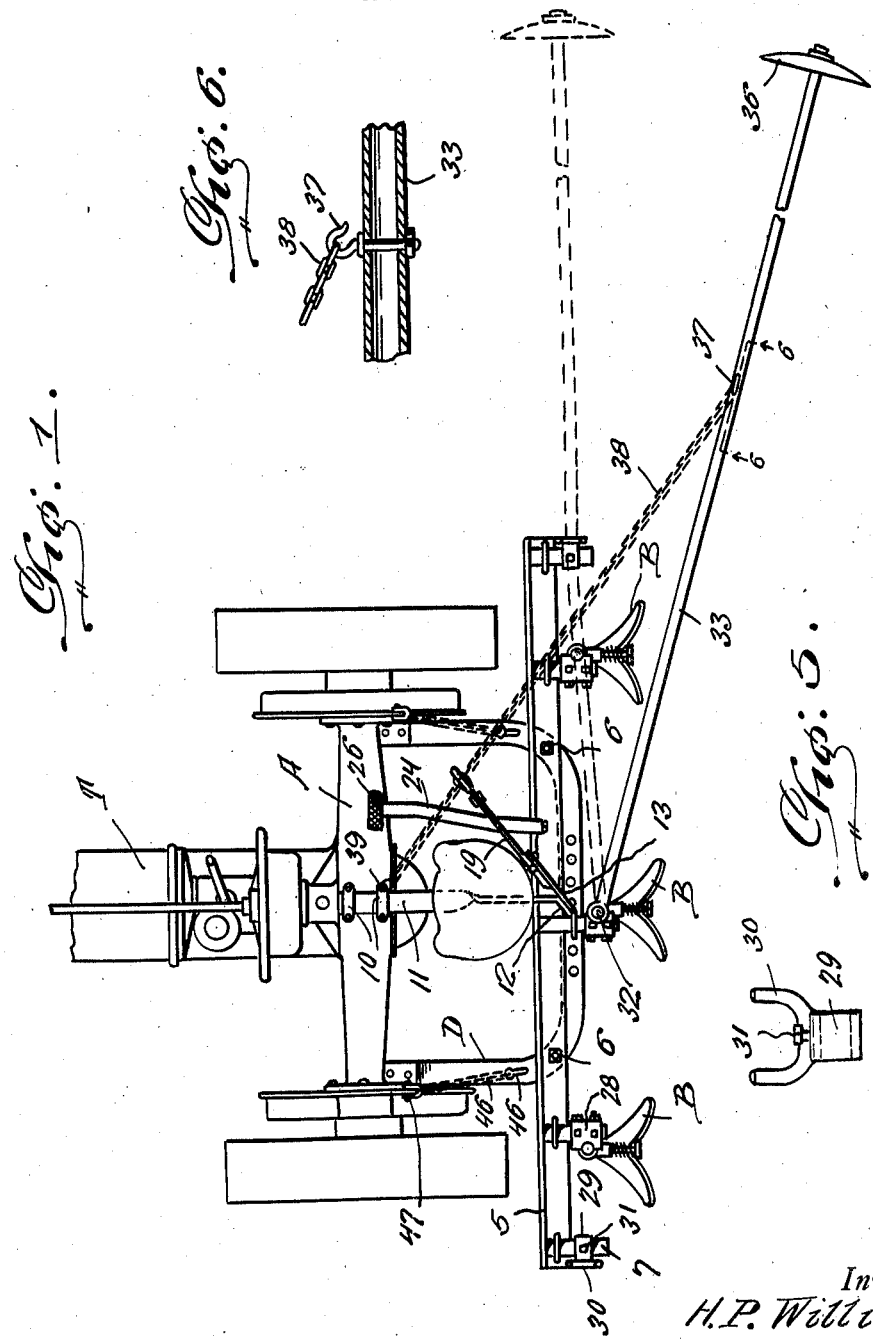

1,616,099

UNITED STATES PATENT OFFICE.

HUBERT PRESTON WILLIAMS, OF HAMLIN, TEXAS.

AGRICULTURAL ATTACHMENT FOR TRACTORS.

Application filed March 26, 1926. Serial No. 97,624.

The present invention relates to agricultural implements generally and more particularly to an attachment which may be mounted on the draw bar of a conventional or any suitable type of tractor and has means thereon for the reception of digging implements and the like.

A very important object of the invention is to provide an attachment of this nature which is exceedingly adaptable for use as a lister cultivator and the like.

Another very important object of the invention is the provision of an attachment of this nature including a marking implement which may be easily and quickly adjusted to extend to either side of the tractor.

Another very important object of the invention resides in the mounting of the attachment on a pivoted draw bar of a tractor so that said draw bar may be lifted or lowered for the purpose of adjusting the digging elements on the attachment in relation to the ground.

Another very important object of the invention resides in the provision of an attachment of this nature which is exceedingly simple in its construction, strong, durable, inexpensive to manufacture, easy to manipulate, attach or detach and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawings:—

Figure 1 is a top plan view of the attachment showing the same in association with a conventional form of tractor.

Figure 2 is a rear elevation thereof.

Figure 3 is a perspective view of the brackets used for mounting the lifting lever and its casting.

Figure 4 is a perspective view showing in detail one end of the beam of the attachment.

Figure 5 is an elevation showing in detail one of the yokes used in connection with the attachment.

Figure 6 is an enlarged detail section taken substantially on the line 6—6 of Figure 1.

Figure 7 is an enlarged detail sectional elevation showing the means of attaching the marker beam to the attachment.

Referring to the drawings in detail, it will be seen that the letter T denotes generally a tractor of a well known type to which my attachment is particularly adaptable. I do not, however, wish to be limited to any particular make or form of tractor, but have shown this conventional form of the tractor since it is provided with the relatively high axle housing A and pivoted U-shaped draw bar D. Referring in detail to the attachment it will be seen that the numeral 5 denotes an elongated angle iron beam substantially L-shaped in cross section and as will be readily apparent from Figure 4, it is preferable to have the lower portion or horizontal portion wider than the upper or vertical portion. This beam 5 is adapted to be disposed on the rear portion of the draw bar D in parallelism with the bight thereof and is preferably held in place by bolts 6 or other suitable fastening elements. A plurality of stub bars 7 are fixed to the beam 5 to extend at right angles therefrom and rearwardly from the tractor. In the present example of my invention I have shown five of these stub bars 7, one of which is located a little to the left of the longitudinal center line of the tractor, two others to the rear of the inner portions of the wheels of the tractor and the remaining two to the outside of the tractor wheels. It is to be understood, however, that I do not wish to be limited in any way to the particular number or the particular arrangement of the stub bars as it is quite apparent and obvious that the beam 5 may be lengthened and additional stub bars attached thereto for receiving various agricultural implements.

I prefer to attach the bars 7 to the beam 5 so that they extend horizontally and rearwardly therefrom and rest on the lower portion thereof with their front ends welded to the vertical portion of the beam and a certain portion of their length welded to the lower portion thereof. I also find it advisable as a further strengthening and stress distributing feature to provide U-bolts 8 to be disposed about the bars 7 and to pierce the lower portion of the beam. Instead of having the U-bolt 8 associated with the center bar 7 pierce the lower portion of the beam 5, I find it preferable and advisable to have this particular bolt piercing the bight of the U-shaped draw bar.

A bracket 9 has its lower end attached as at 10 under the seat spring 11 and extends rearwardly of the seat being pressed and terminating at its upper end in an extension 12 disposed obliquely to the median longitudinal dimension of the tractor so that a casting 13 may be attached thereto. A brace rod 14 is attached as at 15 to the bracket 9 and terminates in a fork 16 having apertured ears 17 for receiving two bolts 18 of the cap C over the differential of the axle housing A. A lever 19 is pivoted intermediate its ends to the casting 13 and has a dog for association with teeth provided on the casting so that the lever may be held in different adjusted positions. A chain 20 is attached to one end of the lever and to the bight portion of the tractor. It will thus be seen that by swinging the lever 19 the draw bar and the beam 5 may be lowered or raised. I prefer to connect a spring 22 with an intermediate portion of the beam 5 as at 23 and with a portion of the casting 13, said spring being tensioned to assist in the raising of the beam and draw bar and implements attached thereto, it being realized that the total weight of the assembly will be such as to make this spring very desirable although not necessary. A rod 24 is attached to the beam 5 as at 25 to the right of the center thereof and rises therefrom and inclines forwardly to terminate below and forwardly of the seat so that the person driving the tractor may maintain his foot on the plate 26 at the upper end of the rod for a purpose which will be explained later.

In the accompanying drawings, I have shown one practical example of the utility of my attachment. Referring to this example in detail it will be seen that letters B denote one piece busters having the usual break foot pieces 27 mounted on clamp sleeves 28 which may be engaged with the center and the two adjacent stub bars 7. On the end stub bars 7 there are placed the sleeves 29 of yokes 30, said sleeves being held tightly in place by set screws 31 or in any other suitable manner. By referring particularly to Figure 7, it will be noted that a stud bolt 32 is drilled or otherwise fixed in the upper end of the foot piece 27 of the center buster B. A beam 33 has one end thereof provided with a flat apertured extension 34 for reception of the stud bolt 32. It is to be noted that the aperture in the extension 34 is larger than the diameter of the bolt so that the beam may be rocked and pivoted thereof. The extension is held against accidental displacement in any suitable manner such as by nut and washer 35. On the other extremity of the beam 33 there is journaled a disk marker 36. Intermediate the ends of the beam 33 there is provided a hook 37. A chain 38 is engaged at one end with the hook 37 and at its other end with one of the bolts 39 which hold the rear clamps 10 in place. This chain 38 is sufficiently long to allow the beam 33 to extend to one side of the tractor and rearwardly at an acute angle to the beam 5. In the present instance the length of the beam 33 is sufficient so that when positioned as just described and as shown clearly in Figure 5, the distance from the right hand buster to the furrow dug by the marker 36 is equal to the distance between the right and left hand busters. It will thus be seen that the center buster, when the tractor is turned around may be run in the furrow dug by the marker element 36. In turning the tractor around the operator sitting on the seat lifts up on the chain 38 to place the beam 33 in the adjacent yoke 30. The tractor is then turned around to place the center buster in the furrow dug by the marker and then the marker is swung to the other side of the tractor and the chain is engaged with the other bolt 39. In other words the marker element is changed from the right hand side of the tractor as shown in Figure 1 to the left hand side thereof.

It is preferable to provide two chains 45 engaged at one end with eye bolts 46 and at their other ends to elements 47. These chains take the place of the ordinary brace chains which come with the type of tractor shown, the chains allowing the raising of the draw bar. This example shows the attachment used as a lister cultivator. Numerous other examples of the utility of this attachment may be given, for instance, two busters B may be mounted on the end stub bars 7 after the yokes 30 have been removed and the other busters have been removed and the marking mechanism has been removed. The two end busters would be used for digging furrows when the ordinary cultivating implement usually supplied with the type of tractor shown is used. These end busters would dig two furrows alongside of the ground cultivated for the purpose of the retension of moisture in the ground between the two furrows. The operator places his foot on the plate 26 so that when the attachment has a trip foot piece, the plate is jostled through the rod 24, thus informing the operator of this fact. The gist of the invention, however, resides in the subject matter of the appended claims. It is to be understood, therefore, that I do not wish to be limited to the examples shown and described herein except in as far as I am limited by the claims, because it is apparent that numerous changes in the details of construction, and in the combination and arrangement of parts may be resorted to without departing from the spirit or scope of the invention as hereinafter claimed.

The present examples of the invention have proved highly practical and have therefore been given in detail since they attain the features of advantage enumerated as desirable in the statement of the invention and the above description.

Having described my invention, what I claim as new is:—

1. An attachment for tractors; wherein the tractor includes a U-shaped pivoted drawbar; comprising a beam attached to the drawbar to extend transversely of the tractor in front of and in parallelism with the bight of the drawbar, a plurality of stub bars projecting rearwardly of the beam and means for raising and lowering the drawbar.

2. An attachment for tractors, wherein the tractor includes a U-shaped pivoted drawbar, comprising a beam, means for attaching the beam to the drawbar in front of and in parallelism with the bight of the drawbar, a plurality of stub bars projecting rearwardly from the beam, a U-bolt extending about one of the stub bars and through openings in the bight of the drawbar, and means for raising and lowering the drawbar.

In testimony whereof I affix my signature.

HUBERT PRESTON WILLIAMS.